July 12, 1966 F. A. BEHNKE 3,261,000

ASSOCIATIVE MEMORY LOGICAL CONNECTIVES

Filed Dec. 22, 1961 5 Sheets-Sheet 1

INVENTOR
FLOYD A. BEHNKE

BY George Baum
ATTORNEY

July 12, 1966 F. A. BEHNKE 3,261,000

ASSOCIATIVE MEMORY LOGICAL CONNECTIVES

Filed Dec. 22, 1961 5 Sheets-Sheet 4

July 12, 1966 F. A. BEHNKE 3,261,000

ASSOCIATIVE MEMORY LOGICAL CONNECTIVES

Filed Dec. 22, 1961 5 Sheets-Sheet 5

United States Patent Office 3,261,000
Patented July 12, 1966

3,261,000

ASSOCIATIVE MEMORY LOGICAL CONNECTIVES

Floyd A. Behnke, Ruby, N.Y., assignor to International Business Machines Corporation, New York, N.Y., a corporation of New York Filed Dec. 22, 1961, Ser. No. 161,491
7 Claims. (Cl. 340—172.5)

Figure 1A:
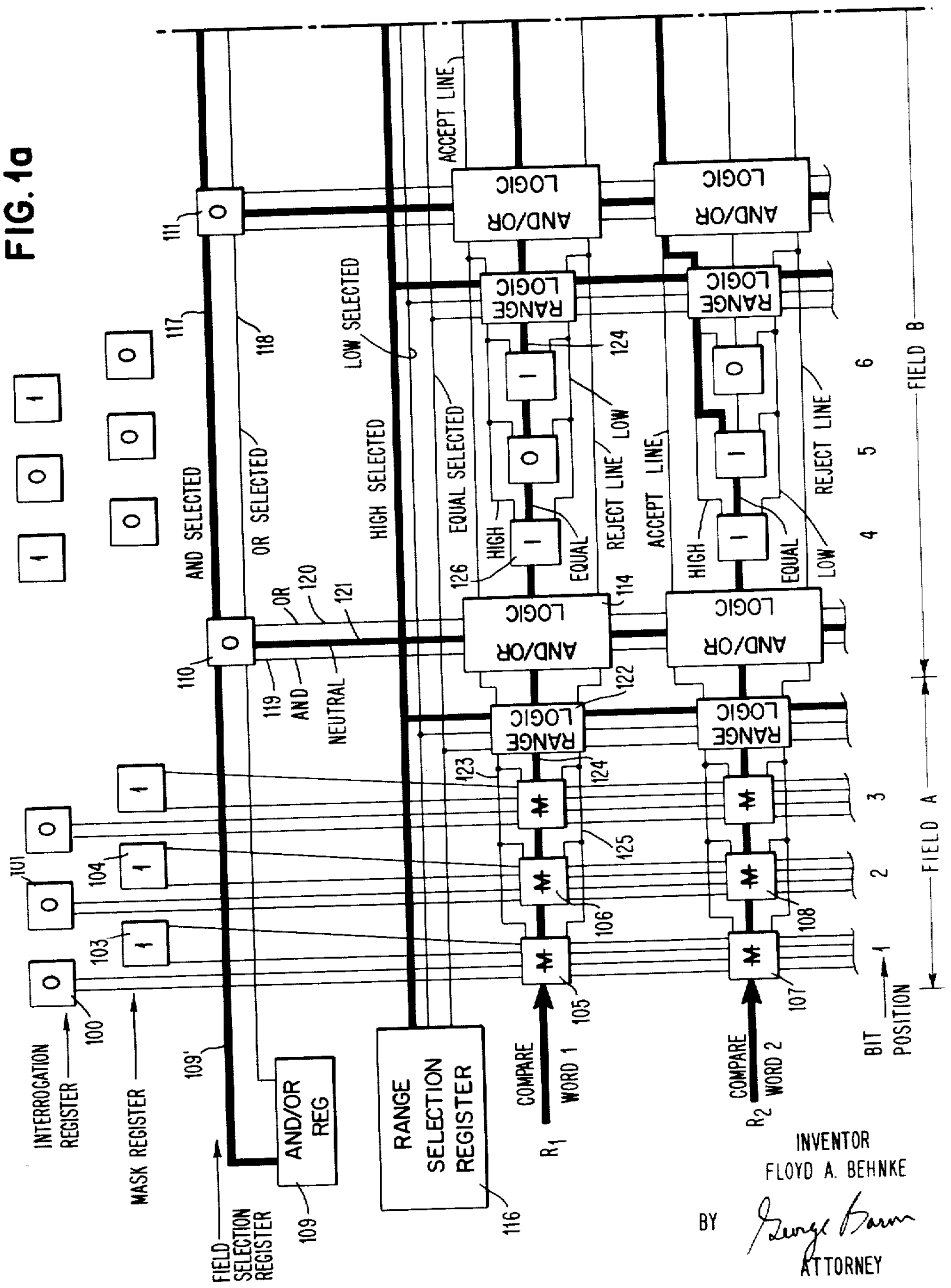

This invention relates to logic circuits in general and more particularly to logical connective circuits to be employed in information retrieval systems.

Associative storage wherein a search of the contents of a memory relies upon simultaneous field correlation is highly desirable for high speed computation. A typical associative memory that would be versatile enough for use in solving a variety of different problems would have the following characteristics:

(1) The bit length of each field in the word is variable.
(2) The location of the fields within a word is variable.
(3) The interrogation of any field(s) may be inhibited during the interrogation of other fields in the word.

Such an associative memory employing cryogenic elements, is set forth in detail in a copending application entitled "Logical Circuits and Memory," filed by Robert R. Seeber, Jr., and Arthur J. Scriver, Jr., on August 22, 1960, having the Serial No. 51,102, and assigned to the same assignee as the assignee of the present invention.

In many information retrieval problems, a computer word may be divided into several fields, each of which contains distinct information. For example, a radar return word from a three-dimensional radar may contain the range, elevation angle, azimuth angle, and identity of the radar site. If the radar data is to be correlated with track-predicted positions in a tracking system, the association or correlation must be done in all three dimensions. This can be done between limits using a standard associative storage. For each radar return, however, each field (range, azimuth, elevation) must be interrogated separately requiring two operations per field, or a total of six operations. When this type of problem (multi-field association) is encountered, it is desirable in the interest of high-speed operation, to simultaneously associate on all fields. The use of logical connectives in the associative storage permits a simultaneous association of range and azimuth and elevation of the radar return with that of all stored predicted track locations. In this way, a radar return can be correlated with a track, between limits, in two interrogations.

Other problems, such as decoy discrimination, may have many more than three fields. Conceivably, the number of measured parameters could be ten and the association process on a field-by-field basis would require ten interrogations. Simultaneous multi-field association made possible with logical-connective circuits would reduce this to one interrogation. A document index file can be used as another example. Each word in the file consists of an index number of a document and ten descriptors. The descriptors are located in fields of equal length; but the field in which a particular descriptor is located is not known because persons entering documents descriptions into the index file may position descriptors differently. The search for a particular document would require that each field be interrogated separately with, in the worst case 55, that is (10+9+8 . . .), separate interrogations being required to locate the desired document. The use of simultaneous multi-field association would reduce the number of interrogations to 10.

In order to attain the simultaneous multi-field association referred to hereinabove, a novel AND/OR logical connective system has been devised to operate with an associative memory. By suitable selection of an AND/OR register, one may obtain multi-field selection involving the AND function or multi-field selection involving the OR function. The AND/OR logical connective system employs cryogenic circuitry in order to be compatible with associative memories employing cryogenic elements. Such cryogenic elements are discussed in detail in a Patent 2,832,897 which issued April 29, 1958, as well as in the copending application noted above wherein the phenomenon of super conductivity is employed to obtain fast switching gates. A typical gate would consist of a layer of tantalum or niobium or other relatively soft superconductor and a control element of a relatively hard superconductor material. When a control current carried by a control element exceeds the critical magnetic field of a gate element, the latter is driven resistive so that any previous current carried by the gate is diverted to another path. It is such type of superconductive gating element which is employed as a basic unit in the AND/OR logical connective shown and described herein.

In general, words in memory are divided into a number of fields, and for purposes of explanation only, we may assume that each word is divided into four fields. Each field may have any number of bit positions and again, for purposes of explanation only, each field may be divided into three bit positions. If desired, a field may consist of three bits, six bits or any number of bit combinations. A multi-field search is obtained by making a simultaneous comparison of all the words in memory with the words appearing in an interrogation register. The words that are compared with the interrogation register may be higher than, lower than, or equal to the interrogation register word. The AND/OR logic is chosen prior to the performance of a simultaneous multi-field association so that the output obtained from such association would indicate whether fields have been ANDed or ORed. A field would be composed of a variable number of word sections and is completely selective through the use of a field selection register. A field might be one word section or it might be the whole word or any combination of word sections. Most important, however, is that the field is not fixed and all fields are not of equal bit length.

Consequently, it is an object of this invention to obtain a novel AND/OR logical connective in an associative memory.

It is another object to obtain an AND/OR logical connective employing cryogenic elements.

It is a further object to employ a novel AND/OR logical connective which would permit interrogation of fields having varying bit lengths.

The foregoing and other objects, features and advantages of the invention will be apparent from the following more particular description of preferred embodiments of the invention, as illustrated in the accompanying drawings.

Figure 1B:
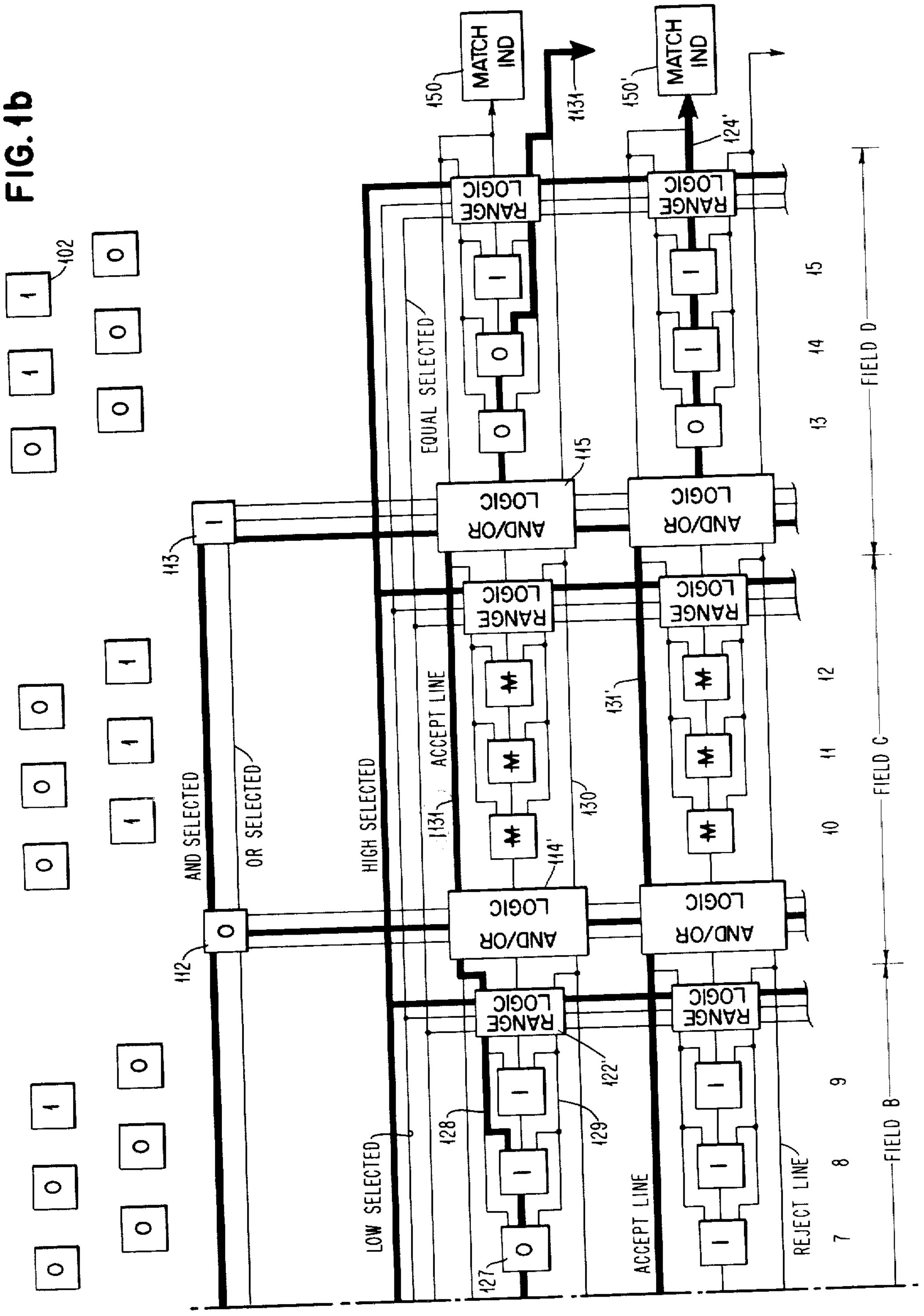

FIGURES 1*a* and 1*b* represent a block diagram of the logical AND connective showing of the invention.

Figure 2A:
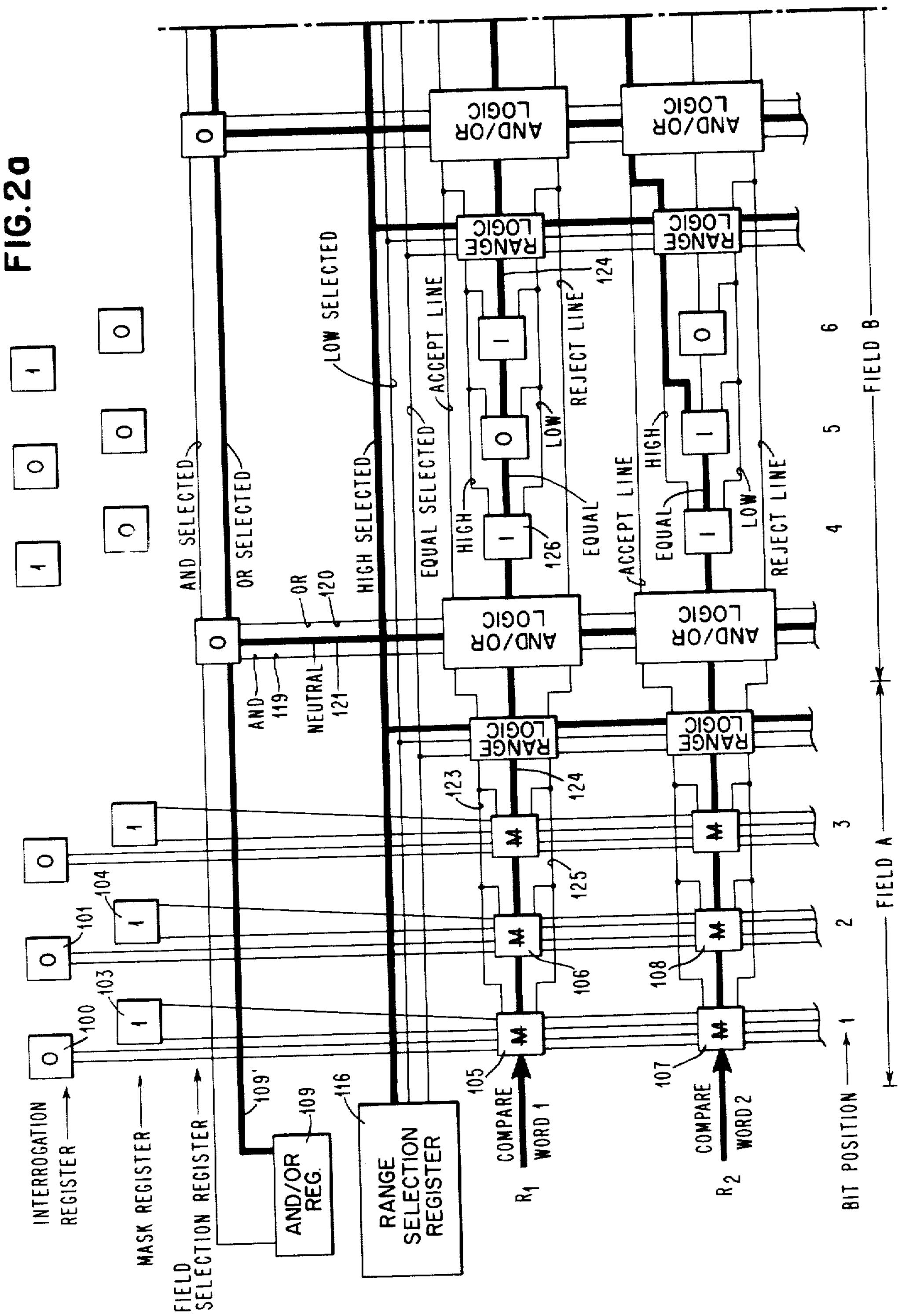
Figure 2B:
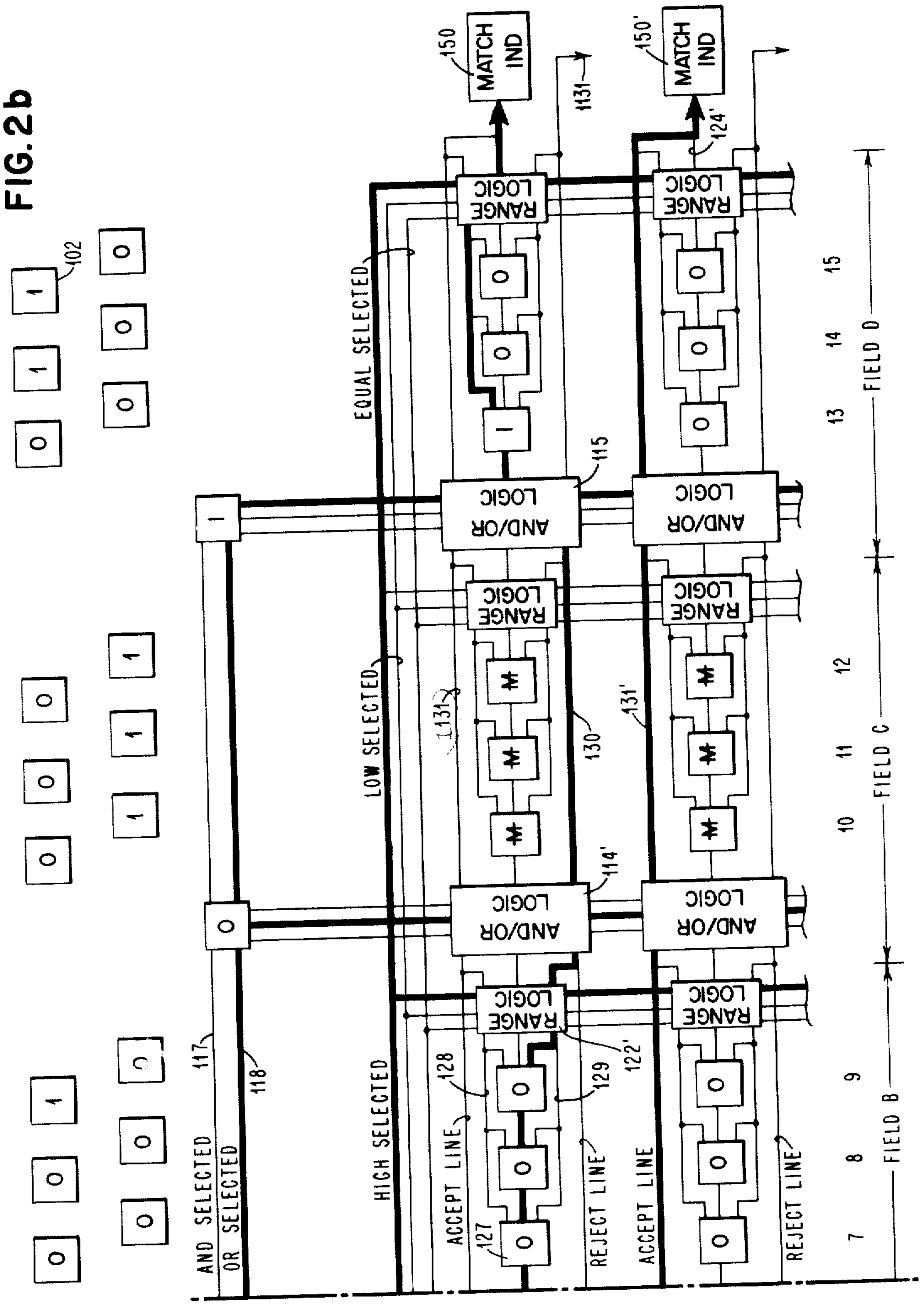

FIGURES 2*a* and 2*b* represent a block diagram of the logical OR connective showing of the invention.

Figures 3, 4:
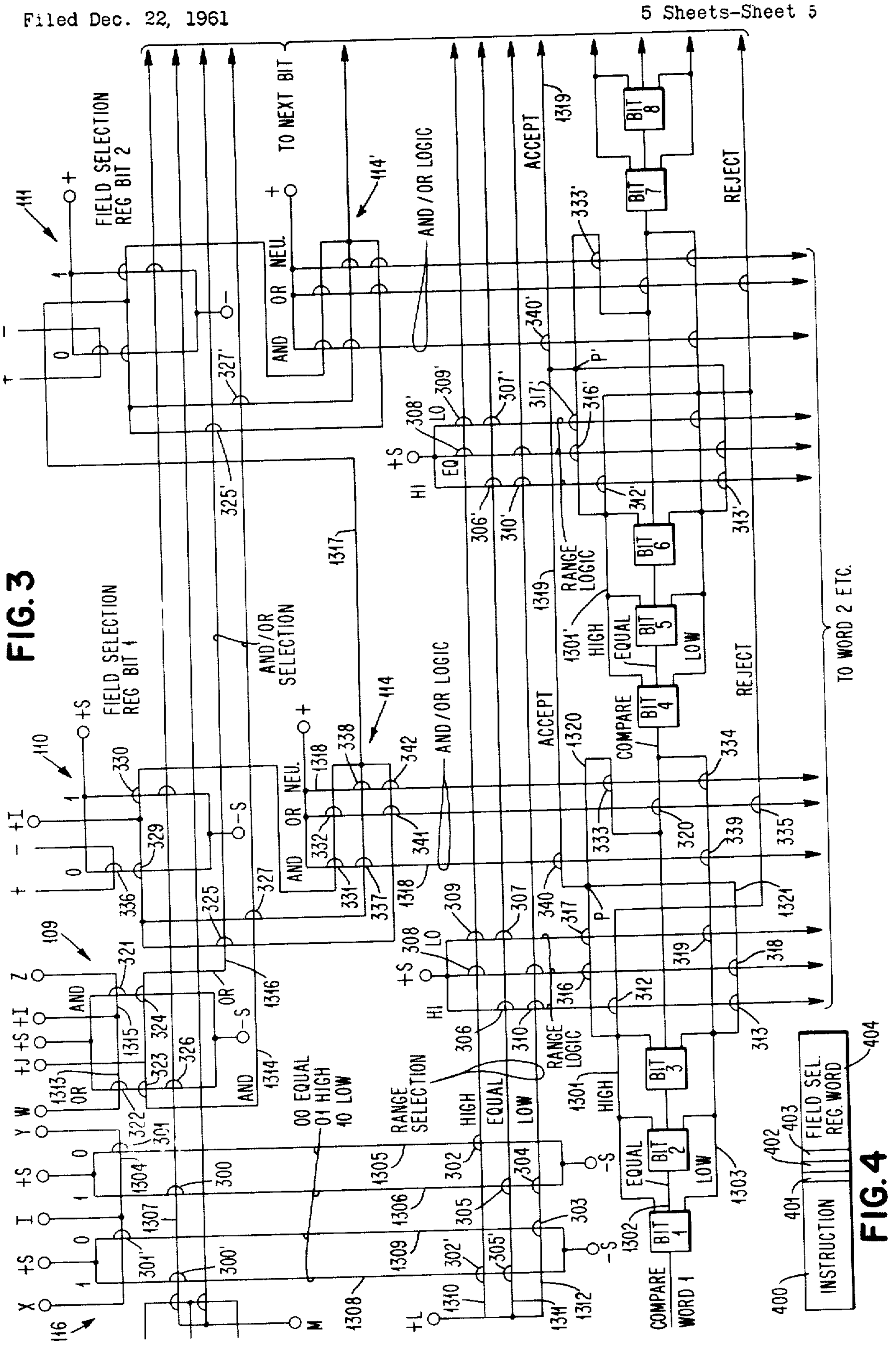

FIGURE 3 is a detailed showing of the cryogenic circuitry employed as the logical connectives for FIGURES 1 and 2; and FIGURE 4 is a showing of an instruction word including instruction bits relative to the selection of a particular logical connective.

Turning to FIGS. 1*a* and 1*b* there is shown a block diagram of a memory and its associated logical connectives. Only two of many word registers are shown, namely, $R_1$ and $R_2$, and an interrogation register comprises bistable elements 100, 101 . . . to 102 wherein bit 100 represents the highest order bit in the interrogation register bit position contains. A "0" in the bit position tion register. A mask register has the same number of bit positions as the interrogation register and a bit position set to the "1" state in the mask register automatically forces a match to occur in the corresponding bit position of all word registers regardless of what the interrogation register bit position contains. A "0" in the bit position of a mask register requires that the bit position in a word register is to be compared with its corresponding bit position in the interrogation register. Thus, the "1" states of bit positions 103 and 104 of the mask register indicate that the bit positions 105, 106 of the first word and bit positions 107 and 108 of the second word are masked out or are logically equal to the corresponding bits in the interrogation register.

In the example given in FIG. 1, bit groups 1 to 3 represent field A, bits 4 to 9, field B, it being understood that field B could be broken up into two fields if desired, bits 10 to 12 represent field C, and bits 13 to 15 field D. The AND/OR register 109 determines whether the AND function will connect two fields or whether the OR function will connect adjacent fields. Bistable bit positions 110, 111, 112 and 113 of the Field Selection Register 109' can be set either to the "0" state or the "1" state. A "0" in bit position 110 indicates that its corresponding logical connective 114 is to be bypassed or deconditioned but when a bit position in the field selection register is in the "1" state, as shown for bit position 113, its corresponding AND logical connective 115 (for this example) is actuated to indicate the beginning of the field where the AND function is to take place. In the example given, the mask register has been set so that fields A and C are not of interest in the search whereas field B must be ANDed with field D to complete a search. A range selection register 116 determines whether a field in a given word must be greater than, equal to, or less than the corresponding field in the interrogation register.

At the start of a search in order to satisfy the search conditions selected, the interrogation register is loaded with a logical statement. Then the mask register is loaded to determine which fields will be of interest in the search. The AND/OR register is loaded to determine whether the AND or the OR function is to be carried out. The range selection register 116 is then actuated to determine whether, in a subsequent compare instruction, one is interested in finding fields in a word in memory that are higher than, lower than, or equal to the corresponding fields that were loaded in the interrogation register.

In the example shown in FIG. 1, the logic requires that field B and field D be greater or equal to the contents in the interrogation register. Logically, $(B \geq IR)(D \geq IR)$ is desired. When the AND/OR register 109 is actuated to select the AND function, current is carried by the AND selected line 117 whereas line 118 carries current when the OR function has been selected. Vertical line 119 primes the connective 114 to perform the AND function, vertical line 120 primes the logical connective 114 to perform the OR function, and line 121 places the connective in its neutral condition, the function of such neutral condition will be described more fully hereinafter. Situated in front of each logical connective is a range logic circuit 122, such range logic circuit serving to divert current appearing on lines 123, 124 and 125 into its adjacent logical connective 114 wherein current appearing on line 123 will indicate that the field in a given register is greater than the field in the interrogation register, line 124 will carry current to indicate that the field in a word is equal to the corresponding field in the interrogation register, and current on line 125 indicates that the field in the word is less than the field in the interrogation register.

Since the logic requires that $(B \geq IR)(D \geq IR)$, bit positions 1 through 3 of field A are masked out and bit positions 10 through 12 of field C are masked out. When a comparison is made, current will go through line 124 because masking equates the compared field with the interrogation field. The current along line 124 of word register $R_1$ is allowed to pass through the logical connective 114 since the "greater than or equal to" condition exists. Such current finds the logical connective 114 in the neutral condition (it being noted that a "0" in bit 110 of the field selection register deconditions the logical connective 114) and is passed into the first bit 126 of field B. Since bits 4 to 6 of the first word compare exactly with the bits in the interrogation register, current proceeds along line 124 and is passed directly to the bit position 127 (FIG. 1*b*) of the first word which corresponds to bit number 7 of the B field. Compare current proceeds to pass through bit position 127 but exits on the high line or "greater than" line 128 to indicate that field B is greater than the corresponding field in the interrogation register. Had field B been less than the corresponding field in the interrogation register, compare current which appeared on line 124 would be diverted to line 129 to traverse range logic 122' and appear on reject line 130 and exit from the register along output terminal 1131 to a suitable sink. For an AND function, as shown in FIGS. 1*a* and 1*b*, once the compare current finds itself on a reject line 130, it never is diverted back to make a comparison of further fields in the memory because the failure of one field when using the logical connective AND circuit is sufficient reason for rejecting the entire word.

Since field B of word 1 is acceptable, it continues to pass through range logic 122' and logical connective 114' along the accept line 131 until it encounters logical connective 115. Since the bit position of the field selection register 109' associated with logical connective 115 is in the "1" state, and the AND connective has been chosen, the compare current on the accept line 131 is diverted through the logical connective 115 to begin a comparison of field D with the bits in the interrogation register. Such comparison shows that the field D of word 1 is less than the field in the interrogation register so that the compare current emanating from the 14th bit of the first word appears at the reject output terminal 1131.

A comparison of word 2 with the interrogation register word produces an output along the equal line 124' of word 2. The details of how the block diagram of FIG. 1 carries out the logic described hereinabove are shown in FIG. 3. Prior to a discussion of FIG. 3, attention is drawn to FIG. 2 wherein the OR logic $(B \geq IR)+(D \geq IR)$ is carried out. In FIG. 2, once an accept condition for any field in a word register has been found, there is no need to divert such condition from an accept line 131, 131', etc. and the accepted word is indicated on a suitable indicating device labeled Match Indicator 150, 150', etc.

In FIG. 3, there is shown, in detail, portions of the AND/OR Register 109, a range selection register 116, and the logic connectives 114, 114', etc. employed in the block diagrams in FIGS. 1 and 2. For the sake of simplifying the illustration of the invention, the interrogation register and the mask register together with their interconnections to the bit positions of the memory registers have not been shown nor are other controls pertinent to the operation of an associative memory shown since they do not form part of the present invention. Suffice to say that it is known how to obtain a parallel search of all same order bits in an associative memory with a given content of the interrogation register to determine how such bits compare and to obtain ouput currents that appear on lines 1301, 1302, or 1303 to designate, respectively, that the compared bit is higher than, equal to, or less than the corresponding bit in the interrogation register. Suitable circuitry, also not shown, exists to produce current on the equal line 1302 whenever a bit position is masked during comparison and that bit position would normally have been considered in the comparison process. To illustrate that information concerning the foregoing is available, attention is directed to the article entitled "Associative Self-Sorting Memory," by Robert R. Seeber, Jr., in the proceedings of the Eastern Joint Computer Conference December 13–15, 1960, at pages 179–187.

Assuming that the interrogation register has been loaded with the desired logical statement and that the mask register has been loaded to set forth the fields of interest, the range selection register 116, the AND/OR register 109 and the logical connectives 114, 114', etc. are actuated in accordance with the logic desired. Prior to the actual description of the specific circuits that comprise the logic, attention is focused on cryotrons 300, 301, 302, 304 and 305 that appear in two parallel paths. Current from the positive terminal of a source of D.C. appears at input terminal +S and takes either the right path or the left path to a sink −S, depending upon the respective states of the cryotrons in both paths. Current appearing on a line such as 1304 is at right angles to cryotron 301 and serves as a control for the state of such cryotron 301. Current on any control line associated with a cryotron will drive the latter resistive, but when control current is removed, such cryotron returns to its superconductive state. When current flows in a given path, such as path 1305, the appearance of resistance in cryotron 301 will divert all current from +S source to the other parallel path 1306 provided cryotron 300 is not resistive. Once total current from +S is diverted to a superconductive path (1305 or 1306), such diverted total current remains in such path even though the cryotrons in the other path return to their respective superconductive states. Current passing through a cryotron along a line, such as line 1306, that is parallel to the cryotron, is gate current that is diverted when control current appearing on line 1307 drives cryotron 300 resistive. The switching characteristics of cryotrons are discussed extensively in the literature tnd patented art and only enough of their characteristics are described herein to aid in a better understanding of the switching circuits employed in the logical connectives described and shown herein.

Once the interrogation register and mask register have been loaded, the machine operator sets the range selection register 116 in the following manner. By sending superconductive current down path 1306 and not down path 1305, cryotrons 305 and 304 are made resistive, but cryotron 302 remains superconductive. In a similar manner, by sending current down line 1309 but not down line 1308, cryotron 303 is made resistive but cryotrons 302' and 305' remain superconductive. During the time that the range selection register 116 is set, a source of current enters input terminal L and proceeds along line 1310, because the other paths 1311 and 1312 are through cryotrons that are each in their resistive state. By setting up a code, one may use a 01 setting of the range select register 116 to represent a selection of words higher than the words in the interrogation register, a 10 setting to represent a low range selection, and a 00 setting to represent a range where the words sought must be equal to the words in the interrogation register. Input terminal I for the range select register is connected to a suitable source of positive electrical energy. If terminal X is pulsed with a negative pulse, control current from I to X will drive cryotron 301' resistive, leaving the left pair of parallel paths in the "1" state. If it is desired to drive the left pair of parallel paths to the "0" state, then current from source M is diverted through cryotron 300' to drive it resistive, causing current from source +S to pass entirely through path 1309 on its way to sink −S. In a similar manner, the right pair of parallel paths of the range select register many be actuated to set such pair either into its "1" or "0" state.

Once the high range has been selected by proper setting of the range select register 116, current proceeds along "high" line 1310 to set the range logic for all the fields in memory. Such current on line 1310 drives cryotrons 308 and 309 resistive so that D.C. current from source +S will pass down the "high" line of the range logic since cryotrons 306 and 310 are superconductive and will cause cryotrons 312 and 313 to become resistive, setting the range logic for bit positions 1 through 3 of all words to the "high" condition. The D.C. current that has been labeled +S and travels vertically throughout the logical controls may originate from the same source, but be directed to appropriate locations by suitable switching circuits not shown. Another range logic associated with cryotrons 306', 307', 308', 309', and 310', etc. is shown, it being understood that the range logic must always immediately precede the AND/OR logic. It is readily seen how the selection of a high, low, or equal condition in the range selection register translates itself into the range logic throughout the associative memory.

Whether the fields in memory are to be ANDed or ORed together is determined by the setting of the AND/OR register 109. When the AND function is to be chosen, terminal W of AND/OR register 109 is pulsed and current from +I source flows through control line 1313 to drive cryotron 322 resistive. Current from +S source will be diverted through cryotron 321 and pass as a control current for cryotron 324, driving the latter resistive prior to passing through sink −S. Current from source +J is diverted through gate 323 to appear on line 1314 to drive cryotrons 327, 327', etc. of all subsequent field selection register bits resistive. If the OR function were desired, then terminal Z of the AND/OR register 109 would be pulsed, directing current from +I source along control line 1315, driving cryotron 321 resistive and diverting current from source +S through gate of cryotron 322 to drive cryotron 323 resistive before passing through cryotron 326 and into sink −S. Since cryotron 323 is now resistive, current from source +J passes through gate of cryotron 324 to appear on line 1316, current on the latter driving cryotrons 325, 325', etc. of each bit in the field selection register to their respective resistive states. If field selection register bit 110 were to be set to its "0" state (indicating neither the AND nor the OR function is desired at that position), cryotron 329 would become resistive so that current from source +I would pass through cryotron 330, apply control current to cryotrons 331 and 332, driving the latter resistive, exit at node N and proceed along line 1317 to the next field selection register bit. With cryotrons 331 and 332 resistive, current from a suitable source of positive potential flows down the neutral line 1318 through cryotrons 338 and 342 and continuing on to drive cryotrons 333 and 334 to their respective resistive states.

By referring to FIG. 3, the operation of the logical connective can be described assuming that all words are sought that are higher than or equal to the word in the interrogation register and that two adjacent fields are to be ANDed, namely (1st field$\geqq IR$) (2nd field$\geqq IR$). The code 01 has been placed in the range select register 116 so that current from source +L appears on "high" line 1310, such current making cryotrons 308 and 309 resistive so that current from source +S travels vertically along the "Hi" line through the gates of cryotrons 306 and 310 continuing on to make cryotrons 312 and 313 resistive. By setting the AND/OR register 109 into the AND state, current appears on line 1314 to make cryotron 327 resistive. The insertion of a "1" into field selection register bit 110 causes current from source +I to pass through cryotron 329, through cryotron 325 (the AND condition has made cryotron 327 resistive), apply control current to cryotrons 341 and 342 to drive the latter resistive and then continue along line 1317 to the logic circuitry of the next field. The setting of cryotrons 341 and 342 to their respective resistive states directs current from a suitable source along line 1318 through cryotrons 331 and 337 to drive cryotrons 340 and 339 resistive, the current continuing on to all the other AND/OR logic circuits of this memory position.

Assuming that the field in bits 1, 2 and 3 of the first word is higher than the interrogation field, current will appear on high line 1301 and will be blocked by cryotron 312 made resistive by the range logic being in the "high" condition and pass through cryotrons 316 and 317. At point P, the current has three possible paths, namely, along line 1319, 1320 or 1321. Line 1319 is blocked by resistive cryotron 340 and line 1321 is blocked by resistive cryotron 313 so the current appearing on the high line 1301 passes along 1320 through cryotrons 333 and 320. (It is noted that had the OR condition been selected, cryotron 340 would have been superconductive and current on the high line 1301 would have continued onto the accept line 1319 onto a suitable indicator circuit, indicating that no other fields had to be examined and the selection of the first word is made.)

When the compare current arrives at bit 4 of the second field, it takes the high equal, or low path, depending upon how the second field compares with the corresponding field in the interrogation register. Assuming that the second field is higher, compare current will appear on line 1301′, bypass resistive cryotron 312′ and go through gates of cryotrons 316′ and 317′ until it reaches point P′. If there are no more fields to be ANDed with the first two fields just compared, all subsequent cryotrons corresponding to cryotron 340′ will be superconductive whereas all subsequent cryotrons corresponding to cryotrons 333′ will be resistive, so that the compare current will appear on accept line 1319 and continue on it until a suitable indicating circuit is actuated.

By tracing the compare current path in FIG. 3 from left to right, it is seen that the neutral condition of the field selection register 109 actually deconditions the AND/OR logic so that the latter has no effect on such compare currents, permitting the latter to travel through a word in an associative memory as if all adjacent bits were one field.

I claim:

1. In an information retrieval system employing a plurality of word registers storing words in binary form, means for subdividing each word into a plurality of corresponding word sections of predetermined bit lengths, an interrogation register for storing a plurality of such word sections, means for performing a simultaneous multi-field comparison between all corresponding fields composed of a variable number of word sections in said word registers with corresponding fields in said interrogation register, and a logical connective between adjacent word sections in every word register, said logical connective being operative to carry out the AND or OR function between successive fields of interest during said simultaneous multi-field comparisons.

2. In an information retrieval system employing a plurality of word registers storing words in binary form, means for subdividing each word into a plurality of corresponding word sections of equal bit-length an interrogation register for storing a plurality of such equal bit-length word sections, means for performing a simultaneous multi-field comparison between all corresponding fields composed of a variable number of word sections in said word registers with corresponding fields in said interrogation register, a logical connective between successive fields of interest in every word register, means for setting such logical connective to one of three conditions, namely, the AND, the OR or the NEUTRAL condition, wherein adjacent fields may be ANDed or ORed by said logical connective during said simultaneous multi-field comparison, or be unaffected by said logical connective.

3. In an information retrieval system employing a plurality of corresponding word sections of equal bit-length, an interrogation register for storing a plurality of such equal-bit length word sections, means for performing a simultaneous multi-field comparison between all corresponding fields composed of a variable number of word sections in said word registers with corresponding fields in said interrogation register, a range selection unit interposed between adjacent fields in each word register for selectively accepting field comparisons indicative that the fields in a word register are higher than, lower than, or equal to corresponding fields in the interrogation register, and a logical connective interposed between said range selection unit and an adjacent word section in a word register, said logical connective being operative to select either the AND function or the OR function of a field within the selected range and any subsequent fields in each word register.

4. In an information retrieval system employing a plurality of word registers storing words in binary form, means for subdividing each word into a plurality of corresponding word sections of equal bit-length, an interrogation register for storing a plurality of such equal bit-length word sections, means for performing a simultaneous multi-field comparison between all corresponding fields composed of a variable number of word sections in said word register with corresponding fields in said interrogation register, a range selction unit interposed between adjacent word sections in each word register for selectively accepting field comparisons indicative that the fields in a word register are higher than, lower than, or equal to corresponding fields in the interrogation register, a logical connective interposed between said range selective unit and an adjacent word section, means for actuating said logical connective to be operable to perform either the AND function or the OR function, and means for transmitting a current representative of a field falling within a selected range through said range selection unit to its associated logical connective, and means for diverting said transmitted current to said next adjacent field in accordance with the logical function indicated by said logical connective.

5. In an information retrieval system employing a plurality of word registers storing words in binary form, means for subdividing each word into a plurality of corresponding word sections of equal bit-length, an interrogation register for storing a plurality of such equal bit-length sections, means for performing a simultaneous multi-field comparison between all corresponding fields composed of a variable number of word sections in said word register with corresponding fields of equal bit-length in said interrogation register, a logical AND connective between adjacent word sections in every word register, a field selection register having a plurality of bistable state elements, each of which is connected to an associated logical AND connective wherein a first state of a bistable element conditions a logical connective to perform its AND function and the other state of said bistable element deconditions said logical connective, and means for entering a coded array of states in said field selection register elements whereby different ones of said logical connectives are actuated during said simultaneous multi-field comparison so as to AND together word sections in each word register in accordance with such coded array.

6. In an information retrieval system employing a plurality of word registers storing words in binary form, means for subdividing each word into a plurality of corresponding word sections of equal bit-length, an interrogation register for storing a plurality of such equal bit-length sections, means for performing a simultaneous multi-field comparison between all corresponding fields composed of a variable number of word sections in said word register with corresponding fields of equal bit-length in said interrogation register, a logical OR connective between adjacent word sections in every word register, a field selection register having a plurality of bistable state elements, each of which is connected to an associated logical OR connective wherein a first state of a bistable element conditions a logical connective to perform its OR function and the other state of a bistable element deconditions said logical connective, and means for entering a coded array of states in said field selection register elements whereby different ones of said logical connectives are actuated during said simultaneous multi-field comparison so as to OR together word sections in each word register in accordance with such coded array.

7. In an information retrieval system employing a plurality of word registers storing words in binary form with each word register thereof containing a plurality of bit sections, said registers being arranged for comparing the bit contents therein with the contents of analogous bit positions of a word in an interrogation register and for providing a high, equal or low comparison result signal, a plurality of pairs of logic means and range means serially connected in each said word register for subdividing the bit positions thereof into fields, range selection means having an output indicative of a selection between high, low and equal comparisons, each of said range means being coupled to sense both the output of said range selection means and the comparison result from the field preceding the said range means and being responsive to the output of said range selection means for selectably producing an output indicative of acceptance, rejection and equal comparisons, field selection means for providing an output signal indicative of a selection between AND and OR operations, and a plurality of coupling means each for selectably passing the output signal of said field selection means to a respective said logic means, each said logic means being constructed and arranged for passing the output from the preceding said range means (A) directly therethrough in response to output signals from the said coupling means connected thereto indicative of selection of a neutral operation, (B) directly therethrough for a match indication while coupling outputs representing other than matched indication for comparison in the next field in response to selection of an OR operation, and (C) directly therethrough when said output is indicative of a failure to match while passing the output indicative of a match from the said range means for comparison in the bit positions of the next subsequent field in response to an AND signal from the said coupling means, whereby simultaneous multi-field comparisons can be performed upon a variety of possible combinations of fields by appropriate selections of instructions for said range selection means, said field selection means and said coupling means.

References Cited by the Examiner

UNITED STATES PATENTS

| | | | |
|---|---|---|---|
| 2,969,469 | 1/1961 | Richards | 340—173.1 |
| 3,031,650 | 4/1962 | Koerner | 340—173 |
| 3,093,814 | 6/1963 | Wagner et al. | 340—173.1 |

OTHER REFERENCES

Pages 115–119, December 1956, Slade et al., A Cryotron Catalog Memory System.

ROBERT C. BAILEY, *Primary Examiner.*

MALCOLM A. MORRISON, *Examiner.*

P. J. HENON, *Assistant Examiner.*